March 17, 1953     W. F. KOZAK     2,631,918
COLOR FORMING CHEMICAL REACTION RECORDER
Filed June 14, 1951

Inventor:
Walter F. Kozak,
by Russell A. Warner
His Attorney.

Patented Mar. 17, 1953

2,631,918

UNITED STATES PATENT OFFICE 2,631,918

COLOR FORMING CHEMICAL REACTION RECORDER

Walter F. Kozak, Swampscott, Mass., assignor to General Electric Company, a corporation of New York Application June 14, 1951, Serial No. 231,608

5 Claims. (Cl. 346—111)

My invention relates to a method and apparatus for producing records by a chemical reaction which results in a color change, and its object is to provide recording apparatus useful for the continuous recording of measurements which requires no ink. In carrying my invention into effect, I provide a chemically treated recording paper and provide a stylus of a material which, when it touches the paper, causes a color changing chemical reaction without the aid of electricity, heat, etc.

Figure 1:
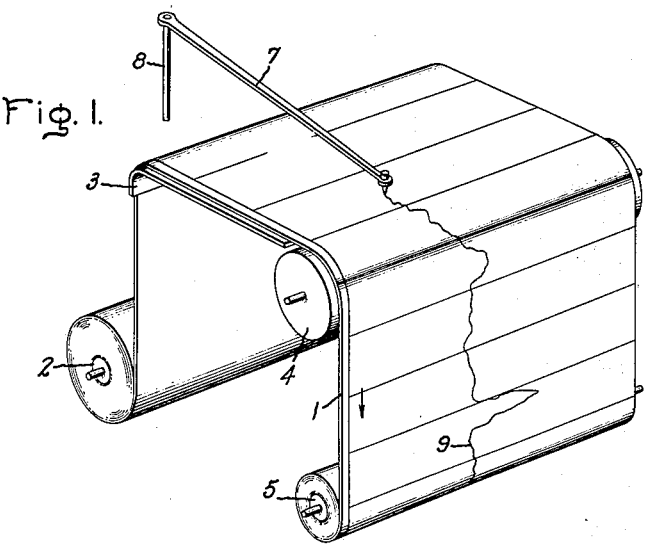

The features of my invention which are believed to be novel and patentable will be pointed out in the claims appended hereto. For a better understanding of my invention reference is made in the following description to the accompanying drawing representing in Fig. 1 recording apparatus embodying my invention, and in Fig. 2 an enlarged cross-sectional view of a preferred form of recording paper and its recording relation with the stylus. Fig. 3 shows another form of stylus.

In the drawing 1 represents a recording chart which is drawn from a supply spool 2, over platen 3, roller 4 to a reroll 5. A marking stylus 6 rests lightly on the surface of the chart over the platen, which stylus is carried by a recording arm 7 pivoted at 8. The pivot shaft 8 may be that of any kind of measuring instrument, the deflection of which it is desired to record, it being understood that as the shaft 8 turns over its measurement range, the stylus 6 is moved laterally across the chart 1 and produces a record thereon as indicated by the record line 9. The particular mechanical details of the recording apparatus such as those mentioned above are immaterial to the invention. The recording paper or chart 1 is made of paper which is chemically treated, and the stylus 6 is made of a material which when it contacts with the paper produces a chemical reaction with the chemical in the paper and causes a color change in such chemical which color change results in the record line 9 traced by the stylus.

A chemical that may be used for treating the paper is phenolphthalein, and a stylus material that may be used to chemically react with the chemical in the paper to produce a color change is a sodium alloy such as sodium lead or sodium amalgam. Other chemical combinations which will produce this result may be used, but I have obtained the best results with the combination mentioned.

The paper may be either one which will absorb the chemical by impregnation or a paper may be used which is coated with a moisture resistant film before being treated with the chemical.

In the latter case I take a good grade preferably of white paper such as recording chart paper and coat its recording surface with a thin coat of ceresin wax. The wax is applied by roller coating or brushing, the wax being in molten liquid form. A uniform coating of wax of a thickness of the order of .0005" is satisfactory. Next a saturated solution of phenophthalein in alcohol is sprayed or brushed over the wax coating. The alcohol quickly evaporates and the chemical is left as a thin, dry coating of a thickness of the order of .0005". Preferably, a third thin layer of transparent moisture resistant lacquer is placed over the chemical to render the recording paper stable with regard to moisture absorption. This latter coating may be omitted if it is assured that the paper in storage and in use will never be subjected to medium or high humidity conditions but since this can rarely be assured, it is best to cover the chemical with a thin layer of transparent moisture resistant lacquer since if this is not done and the recording paper is exposed to humid conditions, spreading of the record may result from the moisture adsorbed or absorbed in the paper. The lacquer film tends to prevent this feathering or spreading when exposed to high humidity atmospheres.

Figure 2:
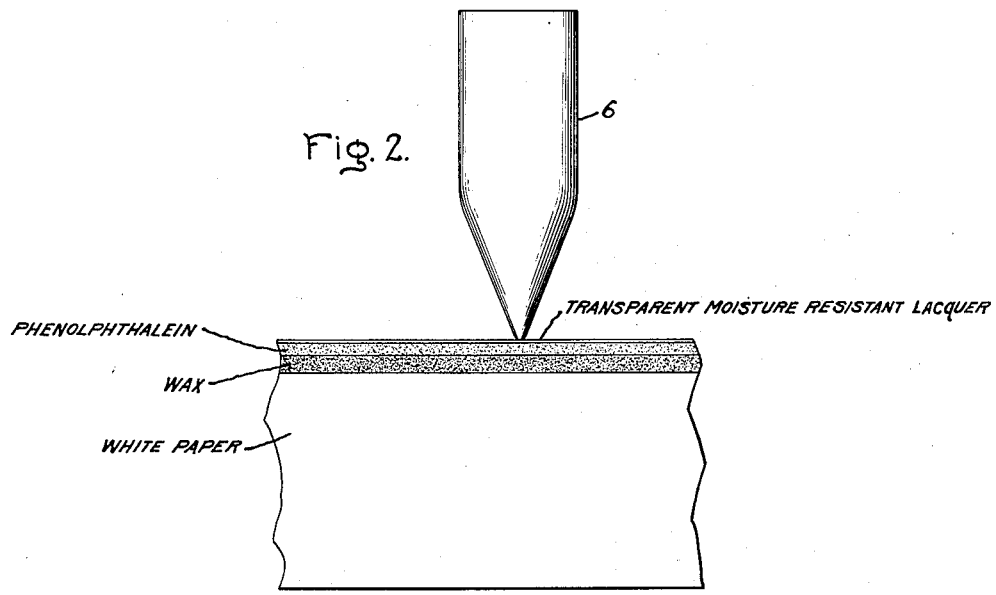
Figure 3:
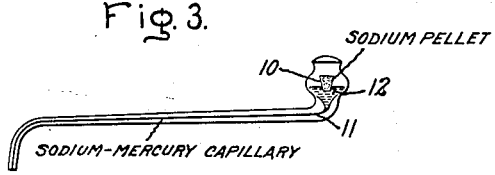

A cross section of the completed recording paper as thus prepared may be represented as in Fig. 2.

The paper as thus treated and protected is white in color as viewed from the recording side. It will not change color or be injured by ordinary handling or by usual humidity or temperature changing conditions.

The recording stylus 6 may consist of a small, short, pencil-like piece of sodium lead or sodium amalgam, the lead or amalgam content being provided to assure reasonably long wearing qualities and the sodium content for the chemical reaction desired. A sodium lead stylus may be prepared as follows: The alloy of sodium-lead is made in a hydrogen atmosphere by melting down the lead and then adding the sodium. The alloy contains approximately 30 per cent sodium and 70 per cent lead.

A modification may consist of this alloy as a core inside of a lead wire. The outer covering of lead prevented oxidation of the sodium-lead alloy.

A sodium amalgam stylus may also be prepared as follows: By dropping a piece of sodium 10 into a capillary tube 11 containing mercury 12. The tube is then sealed off at the upper end and sufficient diffusion of the sodium occurs to give an amalgam formation of sodium at the writing surface. This is represented in Fig. 3. The stylus may have a length of ½–6" and be otherwise shaped and dimensioned in the proportions shown in Fig. 2 and Fig. 3.

The stylus is to rest very lightly on the recording surface so as to reduce friction to a low value where it will not interfere with the accuracy of the measuring instrument used to move the stylus across the paper. A contact pressure of the order of approximately 1 gm. is recommended.

In the recording operation the stylus cuts through the lacquer film and contacts with the phenolphthalein and the following chemical reaction takes place:

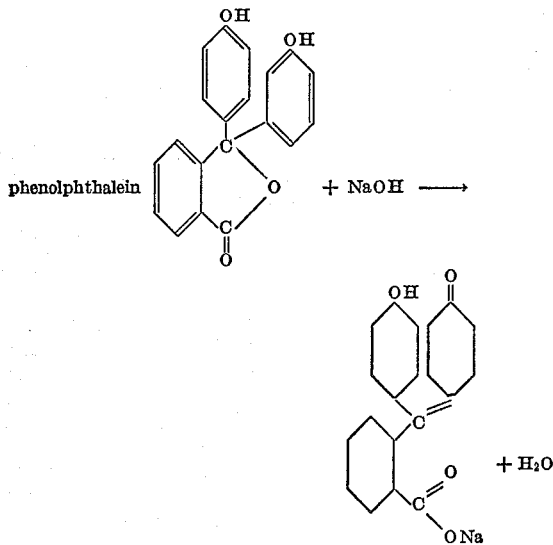

This chemical reaction between phenolphthalein and sodium hydroxide changes the color of the phenolphthalein from white to a red sodium salt of phenolphthalein. This change in color is localized and restricted to the area covered by the point of the stylus, and hence, a clear, fine line record is produced.

Storage of the record after being produced involves no special problems. The only attention required of the recorder other than renewing the chart as needed is an occasional sharpening or renewing of the stylus; for example, the stylus may be examined each time the chart is changed and cleaned, sharpened, or renewed as required.

What I claim as new and desire to secure by Letters Patent of the United States is:

1. Recording apparatus comprising a light-colored, dry paper chart having a recording surface treated with phenolphthalein and a stylus in contact with, and movable relative to, the treated surface of said chart, said stylus carrying a sodium alloy in contact with said treated surface and producing a chemical reaction with the phenolphthalein without the aid of electricity, said chemical reaction changing the color of the phenolphthalein to leave a record on the chart of the movement of the stylus relative thereto.

2. Recording apparatus as claimed in claim 1, in which the stylus carries a sodium lead alloy.

3. Recording apparatus as claimed in claim 1, in which the stylus carries a sodium amalgam alloy.

4. Recording apparatus as claimed in claim 1, in which the recording surface of the chart is treated with a moisture resisting material prior to its treatment with phenolphthalein.

5. Recording apparatus as claimed in claim 1, in which the recording surface of the paper, after being treated with the phenolphthalein, is covered by a thin transparent layer of moisture resisting lacquer.

WALTER F. KOZAK.

REFERENCES CITED

The following references are of record in the file of this patent:

UNITED STATES PATENTS

| Number | Name | Date |
|---|---|---|
| 160,580 | Edison | Mar. 9, 1875 |
| 462,504 | Olan | Nov. 3, 1891 |